United States Patent
Pan et al.

(10) Patent No.: US 11,002,468 B2
(45) Date of Patent: May 11, 2021

(54) METHOD AND SYSTEM FOR CIRCULATING COMBINED COOLING, HEATING AND POWER WITH JET COOLING DEVICE

(71) Applicant: Institute of mechanics, Chinese academy of sciences, Beijing (CN)

(72) Inventors: LiSheng Pan, Beijing (CN); XiaoLin Wei, Beijing (CN); Yuan Yao, Beijing (CN); WeiXiu Shi, Beijing (CN)

(73) Assignee: INSTITUTE OF MECHANICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/809,590

(22) Filed: Mar. 5, 2020

(65) Prior Publication Data

US 2020/0284478 A1    Sep. 10, 2020

(30) Foreign Application Priority Data

Mar. 5, 2019    (CN) .......................... 201910164405.1

(51) Int. Cl.
*F25B 9/06*    (2006.01)
*F25B 9/08*    (2006.01)

(52) U.S. Cl.
CPC ................ *F25B 9/065* (2013.01); *F25B 9/08* (2013.01); *F25B 2400/14* (2013.01)

(58) Field of Classification Search
CPC ........ F01K 25/08; F01K 17/005; F01K 27/00; F01K 25/04; F01K 21/005; F25B 9/08;
(Continued)

(56) References Cited

U.S. PATENT DOCUMENTS 3,237,403 A * 3/1966 Feher .................... F01K 7/32
                                                      60/647
5,752,391 A * 5/1998 Ozaki .................. B60H 1/3204
                                                      62/228.1
(Continued)

FOREIGN PATENT DOCUMENTS

CN    100341607 C  * 10/2007
CN    100362210 C    1/2008
(Continued)

*Primary Examiner* — Frantz F Jules
*Assistant Examiner* — Martha Tadesse
(74) *Attorney, Agent, or Firm* — Bayramoglu Law Offices LLC

(57) ABSTRACT

A method and system for circulating combined cooling, heating and power with a jet cooling device. An outlet of a working medium pump which is used to pressurize liquid working medium is connected to an inlet of a heater. An outlet of the heater is connected to an inlet of an expansion component. An outlet of the expansion component is connected to an inlet of a cooler. An outlet of the cooler is connected to a primary inlet of a jetting device. Primary outlets of the jetting device are respectively connected to an inlet of the working medium pump and an inlet of a throttle valve. An outlet of the throttle valve is connected to an inlet of an evaporator. An outlet of the evaporator and a gaseous outlet of the jetting device are both connected to an inlet of a pressurization component.

12 Claims, 6 Drawing Sheets

(58) Field of Classification Search
CPC .... F25B 11/02; F25B 9/065; F25B 2339/047; F25B 2400/23; F25B 1/08; F25B 2400/14; F01C 13/04
See application file for complete search history.

(56) References Cited

U.S. PATENT DOCUMENTS

| | | | | |
|---|---|---|---|---|
| 7,178,358 | B2* | 2/2007 | Inaba | F25B 27/00 62/498 |
| 7,536,869 | B2* | 5/2009 | Inaba | B60H 1/00885 62/238.6 |
| 8,596,075 | B2* | 12/2013 | Allam | F01K 13/00 60/772 |
| 8,887,524 | B2* | 11/2014 | Mihara | F25B 9/008 62/498 |
| 9,441,865 | B2* | 9/2016 | Inaba | F25B 49/02 |
| 9,869,272 | B1* | 1/2018 | Stuart | F01K 23/06 |
| 2004/0216483 | A1* | 11/2004 | Inaba | F02G 5/04 62/498 |
| 2006/0080985 | A1* | 4/2006 | Inaba | B60H 1/00907 62/238.6 |
| 2007/0175212 | A1* | 8/2007 | Uno | F01K 25/04 60/519 |
| 2007/0245737 | A1* | 10/2007 | Inaba | F01K 25/08 60/670 |
| 2010/0024421 | A1* | 2/2010 | Litwin | F02C 1/05 60/641.8 |

FOREIGN PATENT DOCUMENTS

| | | |
|---|---|---|
| CN | 102538288 A | 7/2012 |
| CN | 102692092 A | 9/2012 |
| CN | 103353169 A | 10/2013 |
| CN | 107345669 A | 11/2017 |
| CN | 108397936 A | 8/2018 |
| CN | 108426388 A | 8/2018 |
| JP | 2004308424 A | 11/2004 |
| SG | 10201405411Q A | 4/2016 |
| WO | WO-2011012047 A1 * 2/2011 ............ F01K 23/04 |

* cited by examiner

METHOD AND SYSTEM FOR CIRCULATING COMBINED COOLING, HEATING AND POWER WITH JET COOLING DEVICE

CROSS REFERENCE TO THE RELATED APPLICATIONS

This application is based upon and claims priority to Chinese Patent Application No. 201910164405.1, filed on Mar. 5, 2019, the entire contents of which are incorporated herein by reference.

TECHNICAL FIELD

The present invention relates to the technical field of combined cooling, heating and power systems, and particularly relates to a method and system for circulating combined cooling, heating and power with a jet cooling device.

BACKGROUND

Energy is an important material base for the continuous progress of human society and plays a crucial role in national security and economic development. At present, fossil energy is still dominant in the energy structure, and the energy shortage is becoming increasingly severe with the gradual depletion of fossil energy.

A distributed energy technique and a principle of energy cascade utilization contribute to the improvement of the utilization ratio of overall energy, and can alleviate the problem of energy shortage. The combined cooling, heating and power belongs to the category of the distributed energy technique, and can simultaneously provide the energy in three forms, including cooling, heating and electricity, to satisfy people's demand for different forms of energy.

Based on the principle of cascade utilization, energy should be used according to its grade, high grade for high use, low grade for low use, in the technology of combined cooling, heating and power, which optimizes the energy supply, contributes to the reduction in irreversible losses in the energy conversion process, and has the characteristics of high comprehensive energy efficiency.

The technology of combined cooling, heating and power may use the combustion heat of the natural gas as a heat source, and achieves the supply of three different forms of energy with a system provided with three functional techniques, which can improve the overall energy efficiency of the system to a certain extent. However, three functional technique modules built in such a system work independently, such as using a gas turbine to generate electricity, using waste heat from the flue gas to drive an absorption refrigeration system, and using a flue gas heat exchanger to collect heat for heat supply, and therefore, problems occur such as complicated intermediate conversion processes of heat energy and relatively large overall irreversible loss; and further, since the modules are relatively scattered and occupy a large space, high initial investment for the system is required.

SUMMARY

For this reason, the present invention provides a method and system for circulating combined cooling, heating and power with a jet cooling device, which can cool primary working medium to a liquid state by using the jet cooling device to satisfy requirements for inlet of the working medium pump.

In order to achieve such an objective, the present invention provides the following technical solutions.

The first aspect of the present invention provides a method for circulating combined cooling, heating and power with a jet cooling device, comprising:

step 100: enabling a liquid circulating working medium pressurized by a working medium pump to enter a heater for heat absorption to obtain a high-temperature and high-pressure circulating working medium;

step 200: enabling the high-temperature and high-pressure circulating working medium to enter an expansion component to expand and produce work and to output shaft work to the outside to generate a low-pressure and high-temperature circulating working medium;

step 300: enabling the low-pressure and high-temperature circulating working medium mixed with a working medium from a pressurization component to enter a cooler to be cooled by a cooling medium to obtain a low-temperature and low-pressure circulating working medium in a near-critical state;

step 400: enabling the low-temperature and low-pressure circulating working medium to enter a jetting device to achieve self-cooling through jetting vaporization to obtain gaseous working medium and low-temperature liquid working medium, a part of the liquid working medium directly entering the working medium pump, and the other part of the liquid working medium entering an evaporator after being throttled and decompressed by a throttle valve; and step 500: enabling the low-temperature liquid circulating working medium to exchange heat with a heat-dissipation medium in the evaporator to generate a low-temperature medium so as to supply a cold source to a user; and enabling a mixture of the gaseous working medium from the jetting device and a gaseous working medium formed by heat absorption in the evaporator to enter the pressurization component to be pressurized, and then, after mixed with the circulating working medium from the expansion component, to enter the cooler again, thereby completing the entire circulation process.

Further, the pressurization component is specifically a compressor or an ejector; and when the pressurization component is an ejector, a gaseous working medium directly entering a low-pressure gas inlet of the ejector and a circulating working medium coming from the expansion component and entering a high-pressure gas inlet of the ejector are ejected by the ejector as a mixed gas and then enter the cooler again.

Further, further comprising a regenerator, wherein a low-temperature and high-pressure circulating working medium obtained by pressurizing the liquid circulating working medium in step 100 by the working medium pump enters a high-pressure side of the regenerator to be heated by the low-pressure and high-temperature circulating working medium after producing work in the expansion component, and then enters a heater again; and meanwhile, the low-pressure and high-temperature circulating working medium after producing work is cooled by the low-temperature and high-pressure circulating working medium pressurized by the working medium pump.

Further, a mixture of a gaseous working medium in step 500 and a gaseous working medium formed after heat absorption in the evaporator is pressurized by the pressurization component, and then is mixed with a working medium from a low-pressure side of the regenerator and enters the cooler again to complete the entire circulation process.

Further, the cooling medium in the step 300 is simultaneously heated by a low-pressure and high-temperature circulating working medium to provide a heat medium to the user, the heat medium being hot water or steam; and a low-temperature medium in the step 500 is frozen water or cold air.

The second aspect of the present invention provides a system for circulating combined cooling, heating and power with a jet cooling device, comprising: a heater, an expansion component, a recuperator, a cooler, a jetting device, a working medium pump, a throttle valve, an evaporator, and a pressurization component, wherein an outlet of the working medium pump used for pressurizing liquid working medium is connected to an inlet of the heater, an outlet of the heater is connected to an inlet of the expansion component, an outlet of the expansion component is connected to an inlet of the cooler through a pipeline, an outlet of the cooler is connected to a primary inlet of the jetting device, primary outlets of the jetting device are respectively connected to an inlet of the working medium pump and an inlet of the throttle valve, an outlet of the throttle valve is connected to an inlet of the evaporator through a pipeline, an outlet of the evaporator and a gaseous outlet of the jetting device are both connected to an inlet of the pressurization component, and an outlet of the pressurization component is connected to an inlet of the cooler.

Further, further comprising a regenerator, wherein a high-pressure side inlet of the regenerator is connected to an outlet of the working medium pump, a high-pressure side outlet of the regenerator is connected to an inlet of the heater through a pipeline, an outlet of the expansion component is connected to a low-pressure side inlet of the regenerator, and a low-pressure side outlet of the regenerator is connected to an inlet of the cooler through a pipeline.

Further, the expansion component is a turbine or an expander.

Further, the jetting device comprises a casing, the casing being provided with a primary inlet and a primary outlet at upper and lower ends thereof, respectively, the casing being provided with a gaseous outlet on a side wall thereof and being provided with a jet wall in a circumferential direction therein, and the jet wall being provided with a plurality of micropores for injecting primary working medium under a pressure difference between the primary inlet and the gaseous outlet; and the gaseous outlet is provided at the upper end of a side wall of the casing.

Further, the pressurization component is a compressor or an ejector, and when the pressurization component is the ejector, an outlet of the evaporator and the gaseous outlet of the jetting device are connected to a low-pressure gas inlet of the ejector, and an outlet of the expansion component is connected to a high-pressure gas inlet of the ejector.

The present invention has the following advantages. By adopting a simple device structure, the present invention can cool the liquid working medium to meet the needs of low-temperature refrigerants in the experimental research or the development for a new circulation system. Adopting such a method and system in the conventional refrigeration cycle contributes to the reduction in the area of the evaporator, thereby reducing a unit size and processing cost.

BRIEF DESCRIPTION OF THE DRAWINGS

In order to more clearly explain the embodiment of the present invention or the technical solutions in the conventional art, the drawings required to describe the embodiment or the conventional art will be briefly introduced below. Obviously, the drawings described below are merely an example, and those skilled in the art may obtain other drawings as the extension of the provided drawings without creative efforts.

The structure, proportion, size, etc. shown in this description are merely used to match the contents disclosed in this description for those familiar to this technique to understand and read, and have no technically substantial meaning since they are not intended to limit the restrictive conditions for implementing the present invention. Any structural modification, change in proportional relationship, or adjustment in size should still fall within the scope of the technical contents disclosed in the present invention without affecting the effect and purpose achieved by the present invention.

Figure 1A:
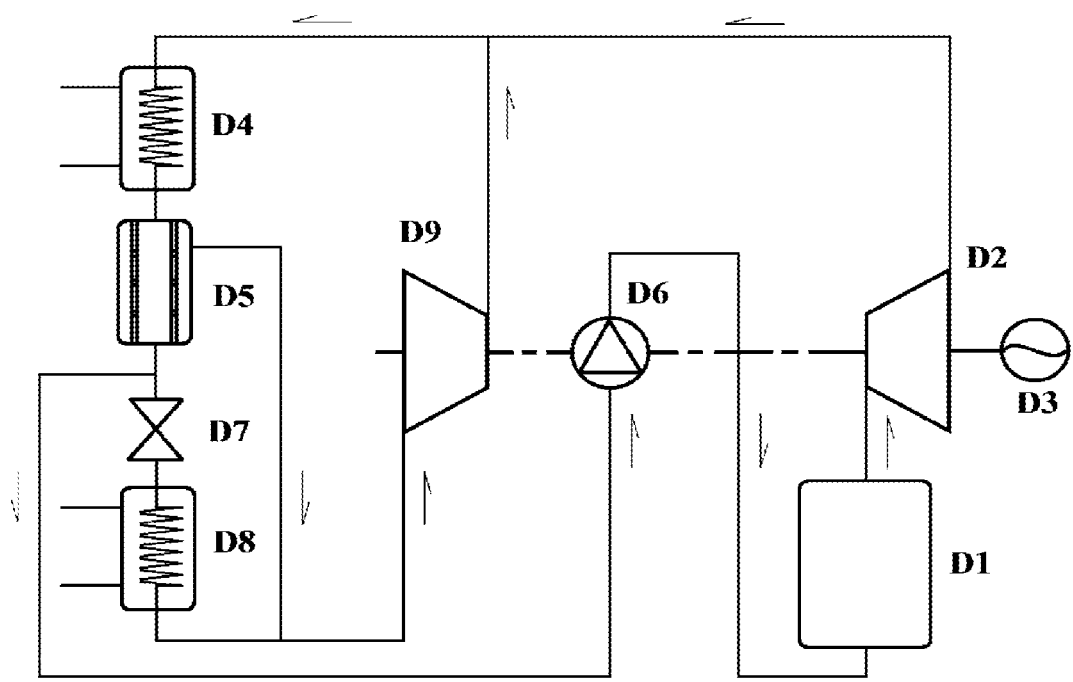
FIGS. 1A-1B are flowcharts for a circulation method and system without a regenerator according to an embodiment of an invention.

In the drawings, D1: heater, D2: expansion component, D3: recuperator, D4: cooler, D5: jetting device, D6: working medium pump, D7: throttle valve, D8: evaporator, D9: pressurization component (compressor), D10: regenerator, D11: ejector;

1: primary inlet; 2: casing; 3: jet wall; 4: micropore; 5: primary outlet; 6: gaseous outlet.

P1: inlet of the expansion component, P2$a$: outlet of the expansion component, P2$b$: outlet of the pressurization component (compressor), P2: inlet of the cooler, P3: inlet of the jetting device; P3$a$, P3$b$, P3$c$: three different micropores on the jetting wall, P4: inlet of the working medium pump, P5: outlet of the working medium pump, P6: outlet of the throttle valve, P7: outlet of the evaporator, Pa: low-pressure side outlet of the regenerator, Pb: high-pressure side outlet of the regenerator.

DETAILED DESCRIPTION OF THE EMBODIMENTS

The present invention is described below using specific embodiments, and those familiar to this technique may easily understand other advantages and effects of the present invention from the contents disclosed in this description. Obviously, the described embodiments are merely a part of embodiments of the present invention but not cover all the embodiments. Any other embodiments obtained by those skilled in the art without requiring any creative efforts based on the embodiments of the present invention all fall within the protection scope of the present invention.

As shown in FIG. 1A, the present embodiment provides a system for circulating combined cooling, heating and power with a jet cooling device. Such a system has the following specific structure and is connected in the following manner. The system mainly includes a heater D1, an expansion component D2, a recuperator D3, a cooler D4, a jetting device D5, a working medium pump D6, a throttle valve D7, an evaporator D8, and a pressurization component D9, wherein the pressurization component D9 may be a compressor or an ejector. The specific relationship thereof is described with reference to FIG. 1A on the presumption that the pressurization component D9 is a compressor.

An outlet of the working medium pump D6 used for pressurizing liquid working medium is connected to an inlet of the heater D1, an outlet of the heater D1 is connected to an inlet of the expansion component D2, an outlet of the expansion component D2 is connected to an inlet of the cooler D4 through a pipeline, an outlet of the cooler D4 is connected to a primary inlet of the jetting device D5, primary outlets of the jetting device D5 are respectively connected to an inlet of the working medium pump D6 and an inlet of the throttle valve D7, an outlet of the throttle valve D7 is connected to an inlet of the evaporator D8 through a pipeline, an outlet of the evaporator D8 and a gaseous outlet of the jetting device D5 are both connected to an inlet of the pressurization component D9, and an outlet of the pressurization component D9 is connected to an inlet of the cooler D4.

Figure 1B:
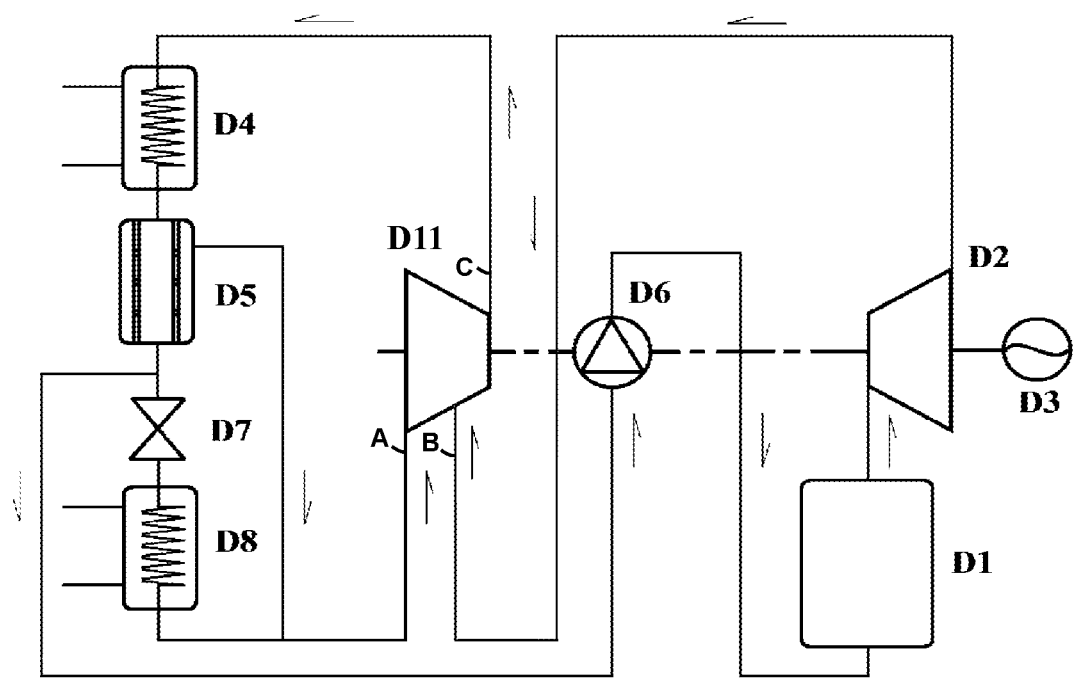

When the pressurization component is an ejector D11 as shown in FIG. 1B, the ejector D11 has a low-pressure gas inlet A, a high-pressure gas inlet B, and an outlet C. Therefore, when the ejector D11 is used instead of the compressor, the outlet of the evaporator D8 and the gaseous outlet 6 of the jetting device D5 are connected to the low-pressure gas inlet A of the ejector D11, and the outlet of the expansion component D2 is connected to the high-pressure gas inlet B of the ejector D11.

Similarly, the system has the following circulation process on the presumption that the pressurization component D9 is the compressor.

Step 100: enabling a liquid circulating working medium pressurized by a working medium pump to enter a heater for heat absorption to obtain a high-temperature and high-pressure circulating working medium.

Step 200: enabling the high-temperature and high-pressure circulating working medium to enter an expansion component to expand and produce work and to output shaft work to the outside, and to provide power to external users through a recuperator and generate a low-pressure and high-temperature circulating working medium.

Step 300: enabling the low-pressure and high-temperature circulating working medium after producing work mixed with a working medium from a pressurization component to enter a cooler to be cooled by a cooling medium to obtain a low-temperature and low-pressure circulating working medium in a near-critical state; during the cooling process, the circulating working medium with a higher temperature heats the cooling medium to provide a heat medium (such as hot water or steam) to users.

Step 400: enabling the low-temperature and low-pressure circulating working medium from the cooler to enter the jetting device to achieve self-cooling through jetting vaporization to obtain gaseous working medium and low-temperature liquid working medium, a part of the liquid working medium directly enters the working medium pump, and the other part of the liquid working medium enters the evaporator after being throttled and decompressed by a throttle valve.

Step 500: enabling the low-temperature liquid circulating working medium to exchange heat with a heat-dissipation medium in the evaporator to generate a low-temperature medium (such as frozen water or cold air) so as to supply a cold source to users; and enabling a mixture of the gaseous working medium from the jetting device and a gaseous working medium formed by heat absorption in the evaporator to enter the pressurization component to be pressurized, and then, after mixed with the circulating working medium from the expansion component, to enter the cooler again, thereby completing the entire circulation process.

In the present embodiment, the pressurization component is specifically a compressor or an ejector, and when the pressurization component is an ejector, a gaseous working medium directly entering a low-pressure gas inlet of the ejector and a circulating working medium coming from the expansion component and entering a high-pressure gas inlet of the ejector are ejected by the ejector as a mixed gas and then enter the cooler again.

Figure 5:
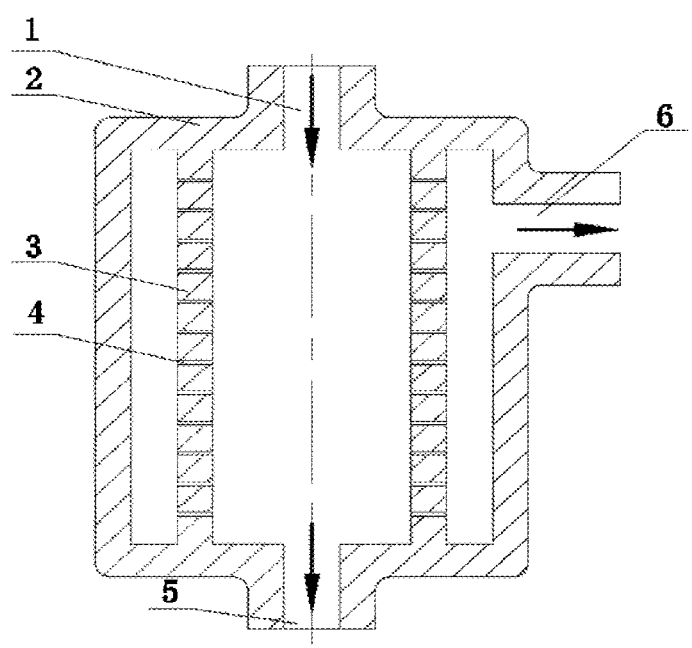
FIG. 5 is a schematic structural diagram of a jetting device according to the embodiment of the present invention.

In the present embodiment, as shown in FIG. 5, the jetting device D5 in step 400 comprises a casing 2, the casing 2 is provided with a primary inlet 1 and a primary outlet 5 at upper and lower ends thereof, respectively, the casing 2 is provided with a gaseous outlet 6 on a side wall thereof and is provided with a jet wall 3 in a circumferential direction therein, and the jet wall 3 is provided with a plurality of micropores 4 for injecting primary working medium under a pressure difference between the primary inlet 1 and the gaseous outlet 6.

The working mode of the jetting device D5 is as follows. The primary working medium (the low-temperature and low-pressure circulating working medium in step 400, which is called the primary working medium in the jetting device) enters the flow channel inside the casing 2 through the primary inlet 1, and is partially injected from the micropores 4 on the jet wall 3 under the pressure difference between the gaseous outlet 5 and the primary inlet 1. In the injection process, accompanying the severe vaporization of the primary working medium, the heat of the primary working medium and the jet wall 3 are absorbed, and in this way, the temperature of the primary working medium is rapidly reduced, and the primary working medium after cooling becomes a liquid state, that is, the low-temperature liquid circulating working medium in step 400.

Due to the relatively small pressure difference in the primary working medium between two sides on the downstream side of the jet wall 3, the injected primary working medium may not vaporize completely. Therefore, the gaseous outlet 6 is arranged on the upper part of a side wall of the casing 2, and in this way, the non-vaporized liquid primary working medium on the downstream side can continue to vaporize and absorb heat when flowing to the upstream side.

The jetting device of the present embodiment can reduce the temperature of the primary liquid working medium by means of self-cooling through jetting, and at the same time, separate the vaporized working medium.

Figure 2:
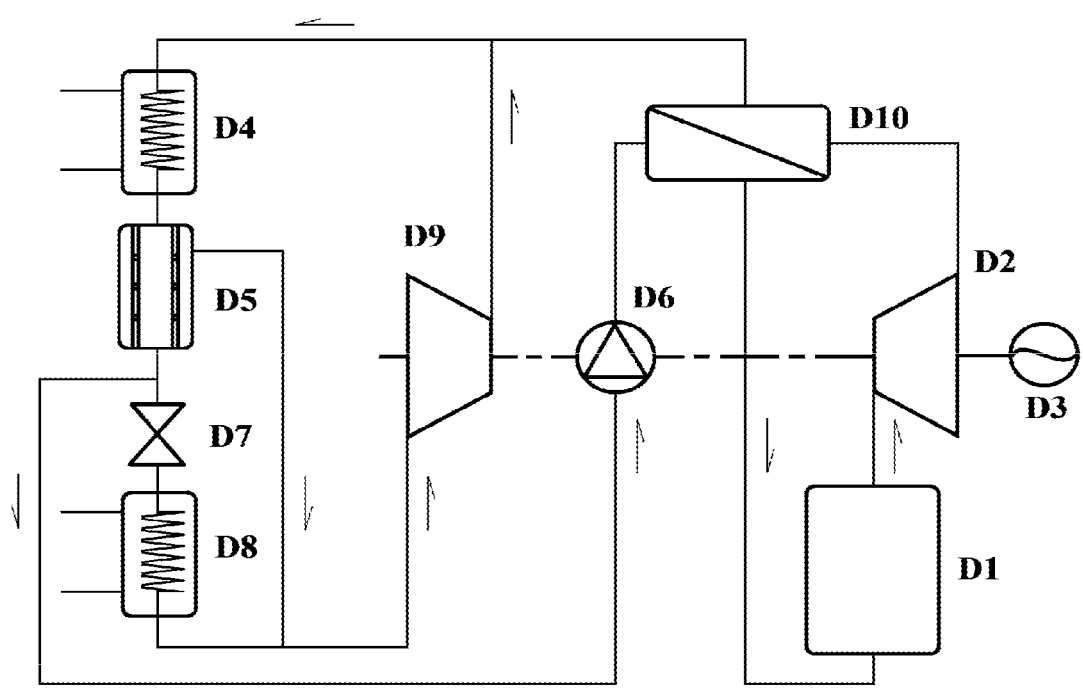
FIG. 2 is a flowchart for a circulation method and system with a regenerator according to the embodiment of the present invention.

In the present embodiment, since the low-pressure circulating working medium from the expansion component (turbine or expander) still has a relatively high temperature, if such low-pressure circulating working medium directly enters the cooler to be cooled, irreversible loss is increased, and even energy loss occurs, which is disadvantageous to the improvement of circulation thermal efficiency. As shown in FIG. 2, in order to make full use of this part of the thermal energy, a regenerator is added to the circulation system to recover the thermal energy to heat the low-temperature working medium from the working medium pump.

The high-pressure side inlet of the regenerator D10 is connected to the outlet of the working medium pump D6. The high-pressure side outlet of the regenerator D10 is connected to the inlet of the heater D1 through a pipeline, the outlet of the expansion component D2 is connected to the low-pressure side inlet of the regenerator D10, and the low-pressure side outlet of the regenerator D10 is connected to the inlet of the cooler D4 through a pipeline.

The circulation process of the system added with the regenerator D10 has changed. In step 100, the low-temperature and high-pressure circulating working medium obtained by pressurizing the liquid circulating working medium by the working medium pump enters the high-pressure side inlet of the regenerator, is heated by the low-pressure and high-temperature circulating working medium after producing work in the expansion component, and enters the heater from the high-pressure side outlet of the regenerator; and at the same time, the low-pressure and high-temperature circulating working medium after producing work is cooled by the low-temperature and high-pressure circulating working medium pressurized by the working medium pump. A mixture of the gaseous working medium in step 500 and the gaseous working medium formed after heat absorption in the evaporator is pressurized by the pressurization component, and then is mixed with a working medium from the low-pressure side of the regenerator and enters the cooler again to complete the entire circulation process.

Figure 3:
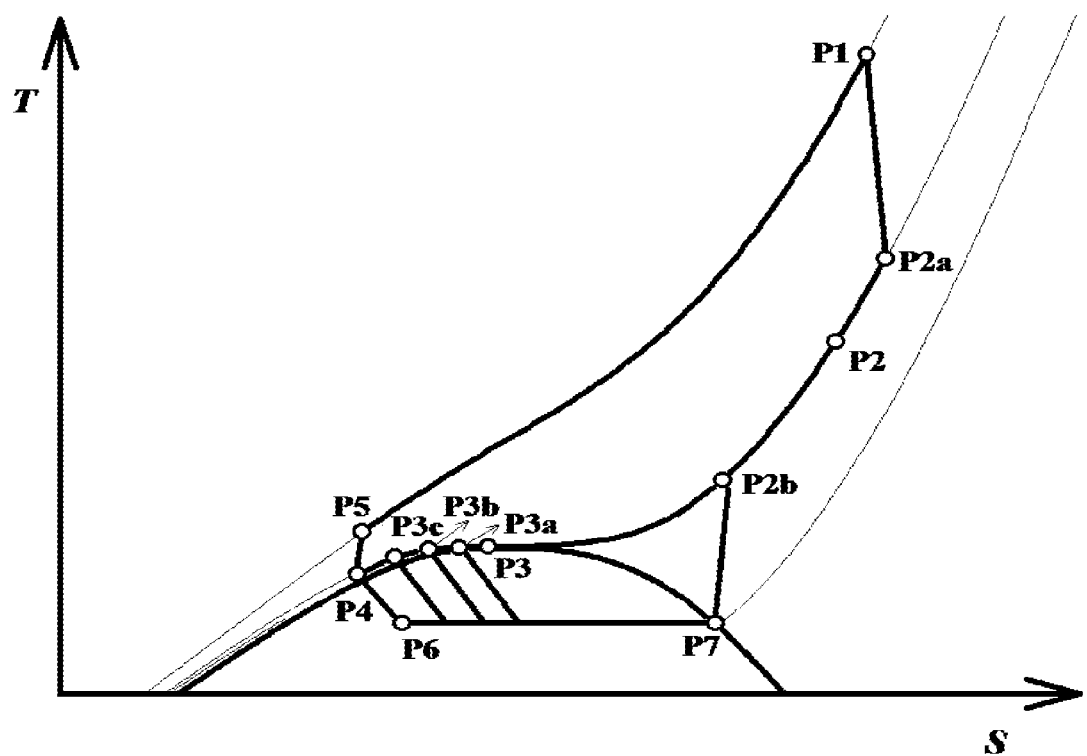
FIG. 3 is a diagram showing the change of a circulation state in the absence of the regenerator according to the embodiment of the present invention.
Figure 4:
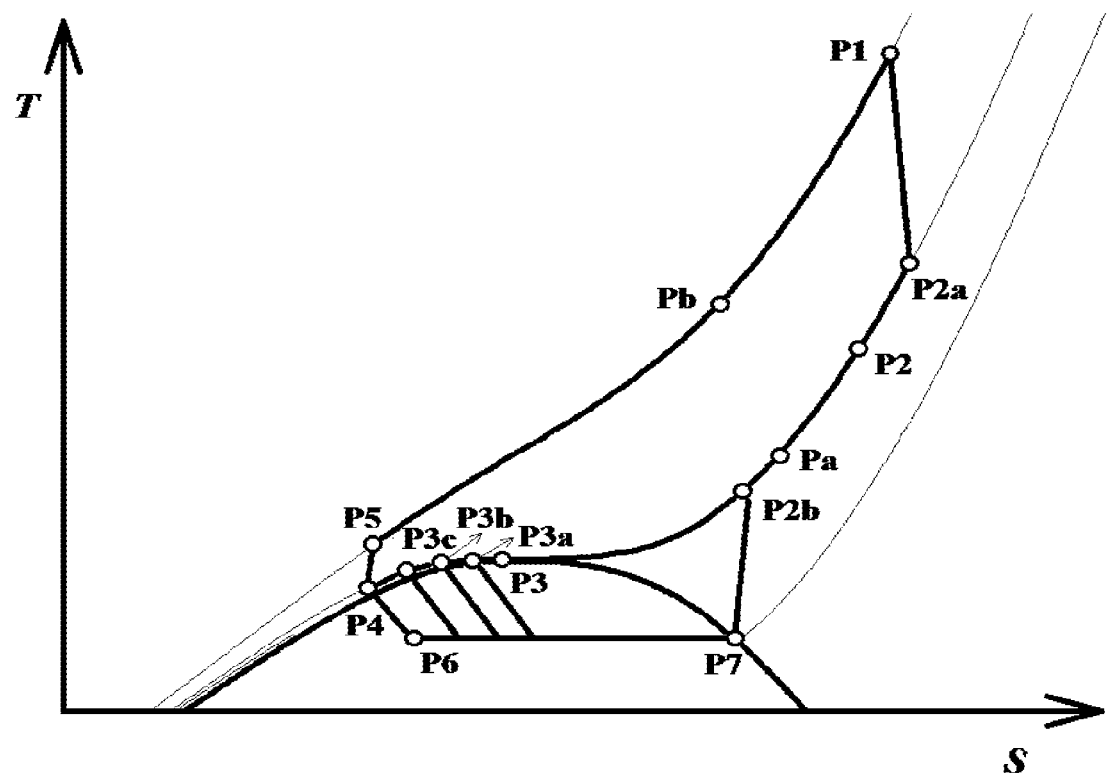
FIG. 4 is a diagram showing the change of a circulation state in the presence of the regenerator according to the embodiment of the present invention.

FIG. 3 and FIG. 4 respectively corresponding to FIGS. 1A-B and FIG. 2 show the change in the states of the working medium in the entire circulation when there is no regenerator and when there is a regenerator, on the presumption that the compressor D9 is the compressor, and the state points shown in the drawings correspond to the temperature and entropy values of the inlet and outlet of each component of the circulation system.

The circulation method and system of the present invention not only achieve the purpose of combined cooling, heating, and power supply and realize the cascade utilization of energy through an integral normal/inverse coupling cycle, but also avoid serious irreversible losses caused by an embedded normal circulation successively subjected to an expansion/throttling process and a pressurization process by adopting the jetting device, thereby greatly improving the comprehensive energy efficiency of the normal/inverse coupling type combined cooling, heating, and power supply circulation.

Although the present invention has been described in detail using the general description and specific embodiments in the above, it is obvious to those skilled in the art that some modifications or improvements can be made based on the present invention. Therefore, these modifications or improvements made without departing from the spirit of the present invention fall within the protection scope of the present invention.

What is claimed:

1. A method for circulating combined cooling, heating and power with a jet cooling device, comprising the following steps:

step 100: allowing a liquid circulating working medium pressurized by a working medium pump to enter a heater for heat absorption to obtain a high-temperature and high-pressure circulating working medium;

step 200: allowing the high-temperature and high-pressure circulating working medium to enter an expansion component to expand and produce work and to output shaft work to an outside to generate a low-pressure and high-temperature circulating working medium;

step 300: allowing the low-pressure and high-temperature circulating working medium mixed with a working medium from a pressurization component to enter a cooler to be cooled by a cooling medium to obtain a low-temperature and low-pressure circulating working medium in a near-critical state;

step 400: allowing the low-temperature and low-pressure circulating working medium to enter a jetting device to achieve self-cooling through jetting vaporization to obtain a first gaseous working medium and a low-temperature liquid working medium, a first part of the low-temperature liquid working medium directly enters the working medium pump, and a remaining part of the low-temperature liquid working medium enters an evaporator after being throttled and decompressed by a throttle valve; and step 500: allowing the low-temperature liquid working medium to exchange heat with a heat-dissipation medium in the evaporator to generate a low-temperature medium so as to supply a cold source to a user; allowing a first mixture of the first gaseous working medium from the jetting device and a second gaseous working medium formed by the heat absorption in the evaporator to enter the pressurization component to be pressurized; after the first mixture is mixed with the low-pressure and high-temperature circulating working medium from the expansion component to form a second mixture, allowing the second mixture to enter the cooler again to complete an entire circulation process.

2. The method for circulating the combined cooling, heating and power with the jet cooling device according to claim 1, wherein, the pressurization component is a compressor or an ejector; and when the pressurization component is the ejector, the second gaseous working medium directly enters a low-pressure gas inlet of the ejector, the low-pressure and high-temperature circulating working medium coming from the expansion component enters a high-pressure gas inlet of the ejector, and the second gaseous working medium and the low-pressure and high-temperature circulating working medium are ejected by the ejector to form a mixed gas to enter the cooler again.

3. The method for circulating the combined cooling, heating and power with the jet cooling device according to claim 1, further comprising:

a regenerator; wherein a low-temperature and high-pressure circulating working medium obtained by pressurizing the liquid circulating working medium in the step 100 by the working medium pump enters a high-pressure side of the regenerator to be heated by the low-pressure and high-temperature circulating working medium after producing work in the expansion component, and then the low-temperature and high-pressure circulating working medium enters the heater again; and the low-pressure and high-temperature circulating working medium after producing the work is cooled by the low-temperature and high-pressure circulating working medium pressurized by the working medium pump.

4. The method for circulating the combined cooling, heating and power with the jet cooling device according to claim 3, wherein the first mixture of the first gaseous working medium in the step 500 and the second gaseous working medium formed after the heat absorption in the evaporator is pressurized by the pressurization component, and then is mixed with a working medium from a low-pressure side of the regenerator and enters the cooler again to complete the entire circulation process.

5. The method for circulating the combined cooling, heating and power with the jet cooling device according to claim 1, wherein,
the cooling medium in the step 300 is simultaneously heated by the low-pressure and high-temperature circulating working medium to provide a heat medium to the user, the heat medium is hot water or steam; and
the low-temperature medium in the step 500 is frozen water or cold air.

6. A system for circulating combined cooling, heating and power with a jet cooling device, comprising:
a heater,
an expansion component,
a recuperator,
a cooler,
a jetting device,
a working medium pump,
a throttle valve,
an evaporator, and
a pressurization component;
wherein
an outlet of the working medium pump configured to pressurize a liquid working medium is connected to an inlet of the heater; an outlet of the heater is connected to an inlet of the expansion component; an outlet of the expansion component is connected to an inlet of the cooler through a first pipeline; an outlet of the cooler is connected to a primary inlet of the jetting device; primary outlets of the jetting device are respectively connected to an inlet of the working medium pump and an inlet of the throttle valve; an outlet of the throttle valve is connected to an inlet of the evaporator through a second pipeline; an outlet of the evaporator and a gaseous outlet of the jetting device are both directly connected to an inlet of the pressurization component; and an outlet of the pressurization component is connected to the inlet of the cooler.

7. The system for circulating the combined cooling, heating and power with the jet cooling device according to claim 6, wherein, the system further comprises:
a regenerator; wherein
a high-pressure side inlet of the regenerator is connected to an outlet of the working medium pump; a high-pressure side outlet of the regenerator is connected to an inlet of the heater through a third pipeline; the outlet of the expansion component is connected to a low-pressure side inlet of the regenerator; and a low-pressure side outlet of the regenerator is connected to the inlet of the cooler through a fourth pipeline.

8. The system for circulating the combined cooling, heating and power with the jet cooling device according to claim 6, wherein,
the expansion component is a turbine or an expander.

9. The system for circulating the combined cooling, heating and power with the jet cooling device according to claim 6, wherein,
the jetting device comprises a casing; the casing is provided with a primary inlet and a primary outlet at an upper end and a lower end of the casing, respectively; the casing is provided with the gaseous outlet on a side wall of the casing and is provided with a jet wall in a circumferential direction of the casing; and the jet wall is provided with a plurality of micropores configured to inject a primary working medium under a pressure difference between the primary inlet and the gaseous outlet; and
the gaseous outlet is provided at an upper end of the side wall of the casing.

10. The system for circulating the combined cooling, heating and power with the jet cooling device according to claim 6, wherein
the pressurization component is a compressor or an ejector;
when the pressurization component is the ejector, the outlet of the evaporator and the gaseous outlet of the jetting device are connected to a low-pressure gas inlet of the ejector, and an outlet of the expansion component is connected to a high-pressure gas inlet of the ejector.

11. The method for circulating the combined cooling, heating and power with the jet cooling device according to claim 1, wherein,
the pressurization component is an ejector; and
wherein the second gaseous working medium directly enters a low-pressure gas inlet of the ejector, the low-pressure and high-temperature circulating working medium coming from the expansion component enters a high-pressure gas inlet of the ejector, and the second gaseous working medium and the low-pressure and high-temperature circulating working medium are ejected by the ejector to form a mixed gas to enter the cooler again.

12. A system for circulating combined cooling, heating and power with a jet cooling device, comprising:
a heater,
an expansion component,
a recuperator,
a cooler,
a jetting device,
a working medium pump,
a throttle valve,
an evaporator, and
a pressurization component, wherein the pressurization component is an ejector, wherein the ejector has a low-pressure gas inlet, a high-pressure gas inlet, and an outlet;
wherein
an outlet of the working medium pump configured to pressurize a liquid working medium is connected to an inlet of the heater; an outlet of the heater is connected to an inlet of the expansion component; an outlet of the expansion component is connected to an inlet of the cooler through a first pipeline; an outlet of the cooler is connected to a primary inlet of the jetting device; primary outlets of the jetting device are respectively connected to an inlet of the working medium pump and an inlet of the throttle valve; an outlet of the throttle valve is connected to an inlet of the evaporator through a second pipeline; an outlet of the evaporator and a gaseous outlet of the jetting device are both connected to the low-pressure gas inlet of the ejector, and the outlet of the expansion component is connected to the high-pressure gas inlet of the ejector; and an outlet of the ejector is connected to the inlet of the cooler.

* * * * *